Figure 4:
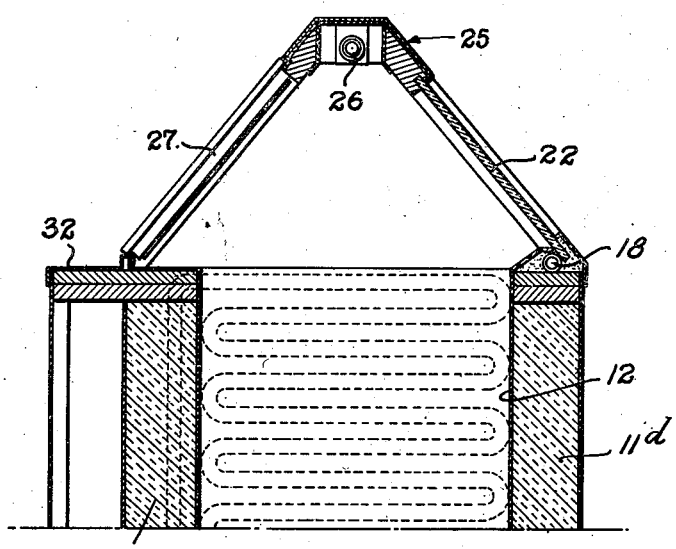

June 15, 1943.　　　L. F. MILLER　　　2,321,695
REFRIGERATING APPARATUS
Filed Nov. 6, 1940　　　3 Sheets-Sheet 1
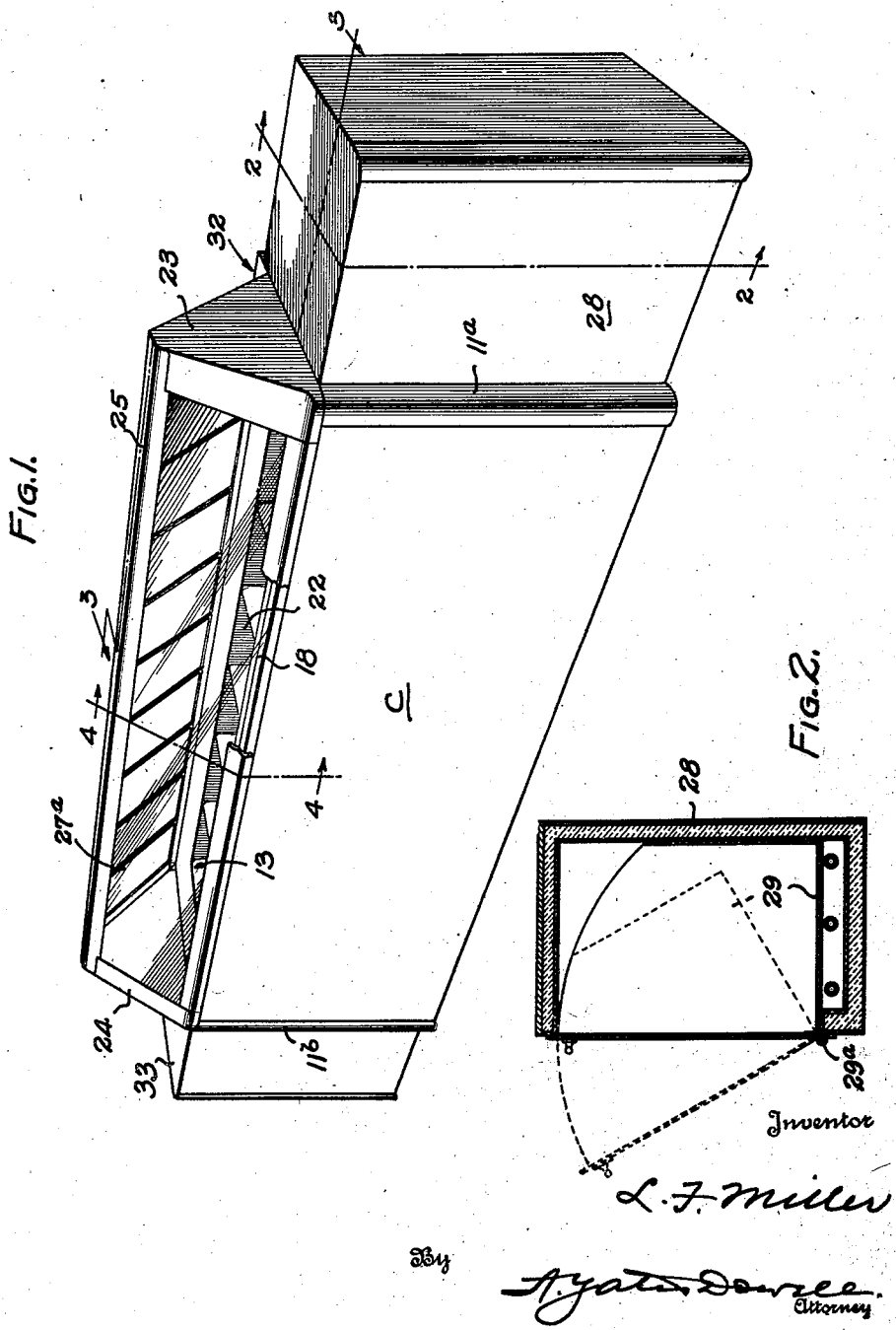
Inventor
L. F. Miller
By
A. Yates Dowell
Attorney

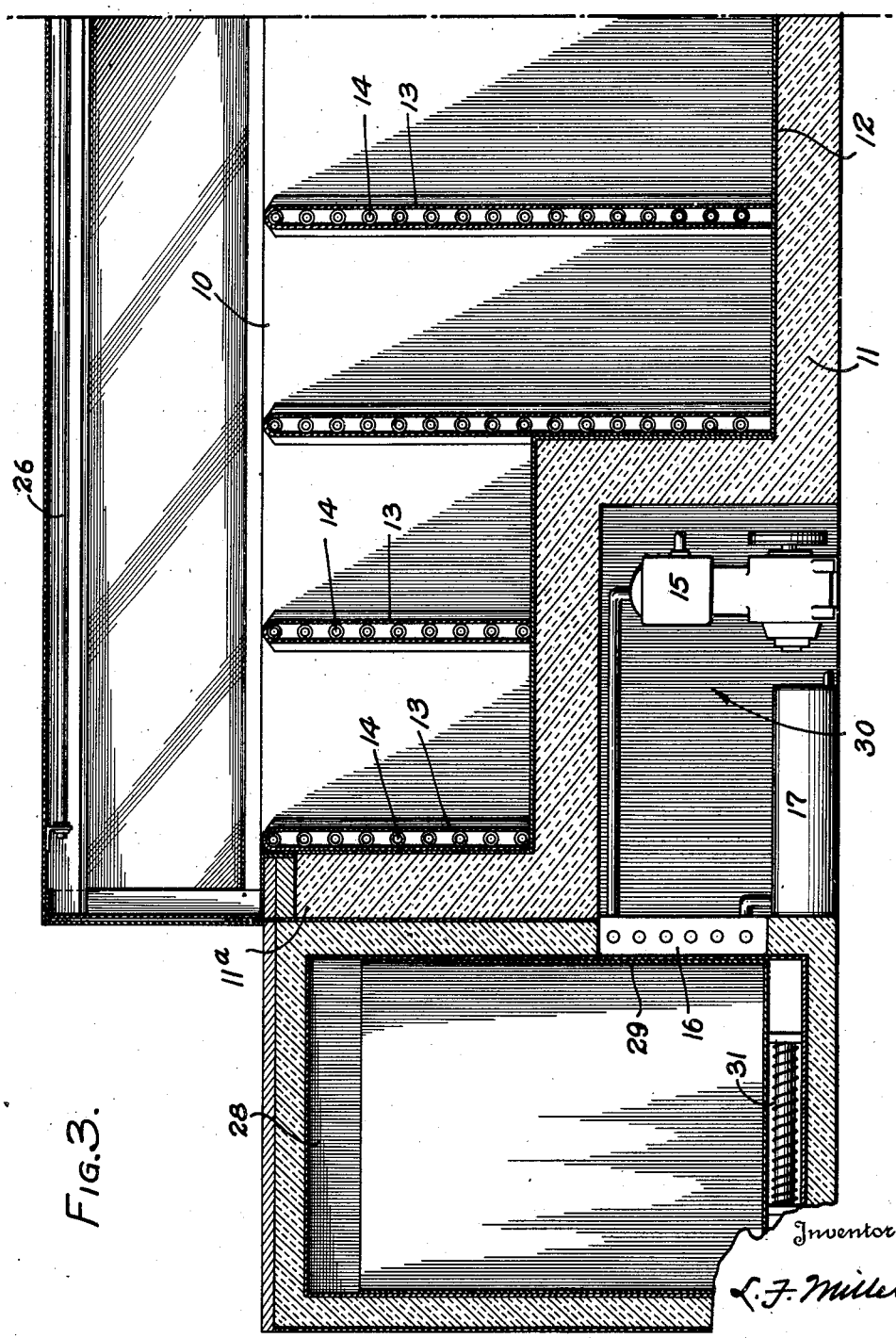

June 15, 1943.   L. F. MILLER   2,321,695
REFRIGERATING APPARATUS
Filed Nov. 6, 1940   3 Sheets-Sheet 3

Inventor
L. F. Miller
By
H. Yates Dowell
Attorney

Patented June 15, 1943

2,321,695

UNITED STATES PATENT OFFICE 2,321,695

REFRIGERATING APPARATUS

Lotus F. Miller, Cambridge City, Ind.

Application November 6, 1940, Serial No. 364,577

9 Claims. (Cl. 62—89.5)

This invention relates to cooling or refrigerating apparatus, and is particularly concerned with an improved cooling cabinet for the storage, display and vending of frozen food products, such as ice cream, ice cream cones and like frozen or refrigerated foods and confection.

Cabinets of the above type are constantly being opened and closed, and in many instances remain open for a relatively long period of time, as for example during a rush of business when to close the cabinet would simply mean a waste of time. In the interests of economy, therefore, it is desirable that the cabinet be constructed in a manner such as to obviate or reduce cold loss to a minimum both when the cabinet is closed and open to room temperature or the atmosphere. At the same time, it is also desirable that the cabinet display the frozen or refrigerated products to the best advantage.

An object of the present invention is to provide a refrigerated storage and display cabinet from which frozen confection and other refrigerated food products may be vended with a minimum of cold loss so that the cabinet may be operated economically while at the same time maintaining the foods at the proper preserving temperature, and which in the case of ice cream should be below the freezing point.

Another and more specific object is to provide a cabinet for the storage, display and vending of frozen confection and like food products having a storage compartment with refrigeration means constructed and arranged to maintain an evenly-distributed low temperature throughout the compartment while at the same time holding the frost line to a level within the region of the top area of the compartment to thereby reduce cold loss when the cabinet is opened and also eliminate frosting and clouding of the display window overlying the said compartment.

Another object is to provide a cabinet of the type specified having a storage compartment with refrigerating means capable of maintaining an evenly-distributed low temperature at a certain level in the compartment and a top closure including a transparent window section which coacts with the refrigerating apparatus to extract heat from the refrigerant and increase the efficiency of the apparatus.

Another object is to provide a cabinet for the storage, display and vending of frozen confections and other food products provided with a main storage compartment for storing the product or products in bulk which is maintained at a low even temperature above which is a space having an overlying cover or top enclosure with a transparent window section, the frost line being held below the level of the window and the latter being in heat exchange relation with the warm liquid refrigerant of the system, to thereby materially reduce the temperature differential between the space above the storage compartment and the outside atmosphere and avoid clouding of the window and cold loss as well as render feasible the installation of fluorescent or like "cold" lighting equipment normally deleteriously affected by unusually low temperatures.

A further object is to provide a cabinet of the type specified which may be operated at an unusually low cost and which at the same time displays the products to their best advantage and is convenient for vending purposes.

Figure 5:
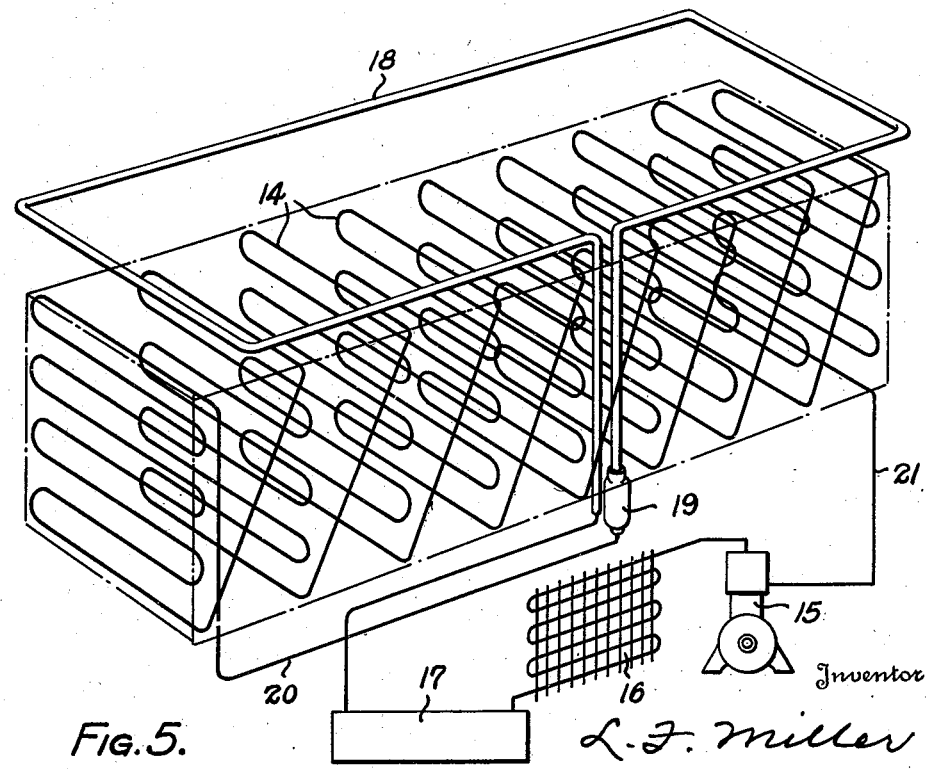

The foregoing and other objects and advantages will become apparent in view of the following description taken in conjunction with the drawings, wherein:

Fig. 1 is a view in perspective of a refrigerated storage, display and vending cabinet embodying the features of the present invention;

Figs. 2, 3 and 4 are sectional views taken respectively on lines 2—2, 3—3 and 4—4, Fig. 1; and Fig. 5 is a diagrammatic view of the refrigerating apparatus.

Generally stated, the improved cabinet comprises a main storage compartment which is divided into a series of supplemental or individual compartments by baffle partitions which in effect constitute evaporator sections, said partitions having refrigerating coils therein. These baffle partitions extend upwardly to a point adjacent the top of the main storage compartment. Above the main storage compartment is a space facilitating access to the merchandise which is closed or covered on the outer side of the cabinet by a transparent window and on the inner side by a plurality of removable covers rendering the storage compartment accessible to a clerk or other party vending the refrigerated product. Due to the location and baffle effect of the evaporator partitions, circulation of air is reduced to a minimum, so that there is an even distribution of temperature, and when the cabinet is uncovered, the cold loss is materially reduced. Furthermore, since the circulation of air in the storage compartment is practically nil, there is a greater tendency for the air to stratify so that the frost line is held to a level adjacent the top area of the compartment. Thus the temperature differential between the space inside of the show case or window section and the atmosphere or room in which the cabinet may be disposed is materially reduced, to thereby reduce clouding of the window. To increase the efficiency of the refrigeration system and further ensure against clouding of the window, the warm liquid line forming part of the refrigeration circuit is enlarged and arranged so that there is a transfer of heat from this line to the window.

Preferably, but not necessarily, a warming compartment is provided at one end of the cabinet for keeping ice cream cones and the like crisp and fresh, the condenser for the refrigerating apparatus being in heat exchange relation to said warming compartment so that heat given off by the condenser is used in maintaining the desired temperature in the warming compartment.

Referring to the drawings in detail, a cabinet illustrative of the invention is indicated at C and comprises a main storage section or compartment 10 which is provided with an insulated bottom wall 11, end walls 11ª and 11ᵇ, and side walls 11ᶜ and 11ᵈ. The compartment is lined by a liner 12 which may be of sheet metal or other suitable material.

The compartment 10 is divided into a plurality of separate compartments, by means of baffle partitions 13, each of which may be of similar construction, preferably consisting of a sheet metal cover or shell in which evaporator coils 14 are disposed, note particularly Figs. 3 and 5. These partitions 13 constitute in effect evaporator sections, the said partitions being closed and extending from the bottom of the compartment 10 to a point adjacent the top of the latter; and they also function as baffles to reduce circulation of air in the main storage compartment. Since the air is more inclined to stratify when in a static condition with the colder strata or layers at the bottom of the compartment, it will be maintained in a more stable condition, so that when the cabinet is opened there is a material reduction in cold loss.

The primary refrigerating apparatus may be of any suitable type. As here shown it includes a compressor 15, note Fig. 5, a condenser 16, and a receiver 17, from which the refrigerant in liquid form passes to a warm liquid line 18 which as will be presently explained constitutes in effect a precooler for the refrigerant, the refrigerant passing from this line through an expansion valve 19 and into line 20 and thence into the evaporator coils 14, from which it returns by way of line 21 to the compressor 15.

The warm liquid line 18 is disposed in a continuous circuit around the top of the main storage compartment 10 in contact with a transparent window 22, note particularly Figs. 1 and 4. The line 18 is preferably enlarged or oversize to provide maximum heat transfer, and in certain instances may be given an oval or flattened contour, depending upon the particular installation. The window 22 is of glass or like transparent material capable of conducting or absorbing heat and acts to extract heat from the refrigerant in the line 18, thereby precooling the latter. At the same time the temperature of the window 22 is raised and the temperature differential between the space at the upper portion of the cabinet and the room or outside atmosphere is materially reduced, thereby obviating clouding or frosting of the window.

The window 22 forms part of a top enclosure or frame made up of end walls 23 and 24 and a top connecting frame section 25. The top section 25 defines a channel or housing for an illuminating member or light 26. This light is preferably of the fluorescent type which is deleteriously affected by temperatures as low as those encountered in ice cream cabinets. However, actual experience has demonstrated that the temperature of the top section of the cabinet, due to the baffle arrangement of the evaporator sections 14 and the action of the warm liquid line 18, may be maintained sufficiently high as to have no deleterious effect on a fluorescent light 26, the use of which has heretofore been considered impractical in refrigeration storage and display cabinets of the type under consideration.

The side of the top frame opposite the window 22 consists of a plurality of insulated covers 27 which are preferably of the type illustrated in Patent No. 1,947,571 granted February 20, 1934 to Earl S. Prince. However, in this instance the inner surface or bottom of each lid is provided with a reflecting means such as a stainless steel covering, indicated at 27ª. The lids 27 are set at an angle such that their inner reflecting surfaces 27ª not only reflect the contents of the cabinet and materially increase the attractiveness and sales appeal of the cabinet, but also reflect heat rays outwardly through the window 22 and thereby assist in maintaining the desired low temperature of the main food compartment.

The series of lids 27 are individually removable and have their upper and lower edges shape to engage the upper and lower edges of the coacting framework in a manner such that they may be swung about said edges, viz, any one of said lids may be completely removed or its bottom or top portion raised to gain access to the contents of the cabinet, note Fig. 4.

Cabinets of the type herein disclosed are used to a considerable extent in vending ice cream in cones, and to maintain the cones fresh and crisp, a warming compartment or oven 28 is located at one end of the cabinet. This warming cabinet is provided with a container 29, preferably of sheet metal or other suitable relatively thin material of high heat conductivity, which is hinged at the bottom as at 29ª so that it may be swung outwardly to the dotted line position illustrated in Fig. 2, thereby rendering the contents readily available. The container 29 is particularly adapted for the storage of ice cream cones.

To assist in maintaining the warming cabinet at the proper temperature, the condenser 16 is located so that the condenser fins are in direct contact, or substantially in contact, with the adjacent wall of the container 29, to thereby conduct heat from the condenser to said container, note Fig. 3 which shows the machinery compartment 30 for the compressor, condenser and receiver located adjacent the warming compartment or oven 28.

An auxiliary heater 31 may be provided in the base of the warming compartment 28, such heater preferably consisting of an electric resistance unit of any suitable type. Obviously very little heat is ordinarily required for this compartment, just sufficient to keep the cones dry and crisp.

The serving or dispensing side of the cabinet is preferably formed with a shelf section 32, note particularly Fig. 4, which serves as a convenient means for placing containers and packages while serving customers.

The end of the cabinet opposite that having the warming compartment 28 is preferably provided with a stand 33 which may support a cash register or function in any other suitable capacity.

Actual experience has demonstrated the efficiency and attractiveness of the improved cabinet. In a typical installation, a temperature of 10 degrees below freezing has been maintained in the upper area of the main storage compartment and a temperature of 45 degrees F. in the space at the top of the cabinet. It has also been demonstrated that a window of a size such as that shown at 22 cools the liquid in the line 18 approximately 20 degrees, thereby greatly increasing the efficiency of the refrigerating system and reducing operating costs. Also, a single thickness of glass may be used in the display window in contradistinction to a series of glass panes arranged in spaced laminated form, a practice which has heretofore been adopted to prevent clouding.

The use of fluorescent lights in a cabinet of this type is of considerable advantage since such lights generate substantially no heat and therefore do not require shields or expensive equipment; and as heretofore noted, due to the relatively high temperature in the space at the top of the cabinet, the use of such lights has been rendered practical.

It will be understood that certain changes in construction and design may be adopted without departing from the spirit or scope of the invention as defined by the appended claims.

What is claimed is:

1. Refrigeration apparatus for the storage, preservation and vending of frozen confection, refrigerated food products and the like comprising a cabinet having insulated walls defining an elongated main storage compartment, a top closure overlying said storage compartment, there being a space between said compartment and closure, a series of evaporator sections having closed shells or covers disposed transversely of the main storage compartment to thereby provide baffles which hinder the circulation of air in said compartment, a transparent window rendering the contents of the cabinet visible, the refrigeration apparatus including a warm fluid refrigerant line in heat exchange relation with said window to thereby extract heat from the refrigerant in said line and also raise the temperature of the window and avoid clouding of the latter.

2. Refrigeration apparatus for the storage, preservation and vending of frozen confection, refrigerated food products and the like comprising a cabinet having insulated walls defining a storage compartment, a closure frame for said compartment having a transparent window therein of heat conducting material, the refrigeration apparatus including a warm liquid refrigerant circulation line located adjacent and in heat exchange relation with said window to thereby extract heat from the refrigerant and assist in precooling the latter and also heat the window to avoid clouding of the window.

3. Refrigeration apparatus for the storage, preservation and vending of frozen confection, refrigerated food products and the like comprising a cabinet having insulated walls defining a storage compartment, a closure frame for said compartment having a transparent window therein of heat conducting material, the refrigeration apparatus including a precooler conduit for circulation of liquid refrigerant extending along and in contact with the window whereby the window functions to extract heat by conduction from the refrigerant.

4. Refrigeration apparatus for the storage, preservation and vending of frozen confection, refrigerated food products and the like comprising a cabinet having insulated walls defining a storage compartment, a closure frame above said compartment having a transparent window therein of heat conducting material, the refrigeration apparatus including a precooler line for circulation of liquid refrigerant which is enlarged and disposed in contact with the lower edge portion of the window.

5. Refrigeration apparatus for the storage, preservation and vending of frozen confection, refrigerated food products and the like comprising a cabinet having insulated walls defining a main storage compartment, a closure frame above said compartment having a transparent window section therein consisting of a single thickness of glass or like material, the refrigeration apparatus including an enlarged precooler line for circulation of liquid refrigerant extending in a continuous circuit at the base of said top closure frame and in contact with the lower edge of the window.

6. Refrigeration apparatus for the storage, preservation and vending of frozen confection, refrigerated food products and the like comprising a cabinet having insulated walls defining an elongated main storage compartment, a top closure overlying said storage compartment, a series of evaporator elements disposed transversely of the main storage compartment to thereby provide baffles which hinder the circulation of air in said compartment, a transparent window rendering the contents of the cabinet visible, the refrigeration apparatus including a warm fluid refrigerant line in heat exchange relation with said window to thereby extract heat from the refrigerant in said line and also raise the temperature of the window and avoid clouding of the latter.

7. Refrigeration apparatus for the storage, preservation and vending of frozen confections and other refrigerated foods comprising insulated walls defining a food storage compartment, refrigeration equipment for reducing the temperature within the storage compartment and including relatively large heat exchange surface, air circulation reducing means within said storage compartment for maintaining refrigerated air therein in a quiescent state, a top for said storage compartment including a transparent window section at the front of the cabinet inclined rearwardly from bottom to top and an opaque closure structure at the rear of the cabinet inclined generally forwardly from bottom to top, said closure structure having a frame with confronting top and bottom edges and closure units each having its underside provided with a reflecting surface and said confronting edges cooperating with corresponding edges of the units to support the latter in closure forming position and permitting any one thereof to be swung about its top or bottom edge on its frame or to be removed therefrom.

8. In a refrigerated display case, walls defining a storage compartment, a top for said storage compartment having its front and rear walls inclined toward each other from bottom to top and provided with a transparent window section at the front and a frame providing an access opening at the rear with confronting top and bottom edges and opaque closure members for closing said access opening, said opaque closure members each having its underside provided with a reflecting surface and its top and bottom edges cooperating with the corresponding confronting edges of the access opening to support the units in closure forming position permitting them to be swung selectively each about its top and bottom edge on the frame of the access opening or to be removed therefrom.

9. In a refrigerated display case, walls defining a storage compartment, refrigeration equipment for reducing the temperature of said compartment and including relatively large heat exchange surface, means for reducing circulation and for maintaining refrigerated air in the refrigerated compartment in a quiescent state, and closure means for the top of said storage compartment including a transparent window in the front thereof and in the rear a frame with confronting top and bottom edges, said frame providing an access opening, closure means for said access opening comprising a plurality of closure lids having interfitting contiguous edge portions and all being slidably mounted in substantially the same plane so that any one lid may be slid to any position or swung on its edge or easily applied or removed.

LOTUS F. MILLER.